(12) United States Patent
Cleaver

(10) Patent No.: US 9,332,749 B2
(45) Date of Patent: May 10, 2016

(54) AUDIO TRAPPING LURE

(71) Applicant: Gary L. Cleaver, Colony, KS (US)

(72) Inventor: Gary L. Cleaver, Colony, KS (US)

( * ) Notice: Subject to any disclaimer, the term of this patent is extended or adjusted under 35 U.S.C. 154(b) by 82 days.

(21) Appl. No.: 14/339,117

(22) Filed: Jul. 23, 2014

(65) Prior Publication Data

US 2016/0021870 A1    Jan. 28, 2016

(51) Int. Cl.
*A01M 31/06* (2006.01)
*A01M 31/00* (2006.01)
*G08B 25/10* (2006.01)
*H04R 3/00* (2006.01)
*H04W 4/12* (2009.01)

(52) U.S. Cl.
CPC ............. *A01M 31/06* (2013.01); *A01M 31/002* (2013.01); *A01M 31/004* (2013.01); *G08B 25/10* (2013.01); *H04R 3/00* (2013.01); *H04W 4/12* (2013.01)

(58) Field of Classification Search
CPC ... A01M 29/16; A01M 23/38; A01M 31/002; A01M 31/004; H04R 3/00; G08B 25/00; H04W 4/12
See application file for complete search history.

(56) References Cited

U.S. PATENT DOCUMENTS

| | | |
|---|---|---|
| 5,233,780 A | 8/1993 | Overholt |
| 5,555,664 A | 9/1996 | Shockley |
| 5,555,666 A | 9/1996 | Glatzer |
| 6,137,415 A | 10/2000 | Rast |
| 6,757,574 B2 | 6/2004 | Gardner et al. |
| 6,904,868 B2 * | 6/2005 | Block .................. A01K 5/0114 119/51.12 |
| 7,333,395 B2 * | 2/2008 | Lewis .................. A01K 79/02 367/139 |
| 8,025,550 B2 * | 9/2011 | Tsengas ............... A01K 15/025 119/707 |
| 8,109,239 B1 * | 2/2012 | Smestad ............. A01K 15/025 119/702 |
| 8,291,637 B2 | 10/2012 | Patterson et al. |
| 8,336,251 B2 | 12/2012 | Orchard |
| 8,792,306 B2 * | 7/2014 | Palmer .................. A01K 79/02 367/139 |
| 2004/0059466 A1 * | 3/2004 | Block .................. A01K 5/0114 700/241 |
| 2008/0151055 A1 * | 6/2008 | Elsemore ............ A01M 31/002 348/155 |
| 2008/0159079 A1 * | 7/2008 | Dir ........................ A01K 97/125 367/139 |
| 2009/0151221 A1 | 6/2009 | Daley |
| 2010/0208068 A1 * | 8/2010 | Elsemore ............ A01M 31/002 348/143 |

* cited by examiner

Primary Examiner — Daniel Pihulic
(74) Attorney, Agent, or Firm — Dale J. Ream

(57) ABSTRACT

An audio trapping lure includes a housing defining an interior area for containing electronic components including a processor, a daylight sensor, a body heat sensor, cell phone transmission capabilities, and a speaker. The audio trapping lure includes digital sound files of the distress cries of prey of a predator to be hunted or trapped. Under the control of programming, the processor causes predetermined distress cries to be emitted through the speaker at predetermined intervals of time and for a predetermined duration. The audio trapping lure is activated only when the daylight sensor indicates it is dark. The audio trapping lure is deactivated when the body heat sensor detects the proximity of a heat source, indicating the predator has already been trapped. The cell phone text function is activated upon the deactivation of the device by the body heat sensor indicating an animal has been trapped.

13 Claims, 4 Drawing Sheets

AUDIO TRAPPING LURE

BACKGROUND OF THE INVENTION

This invention relates generally to audio trapping lures and, more particularly, to an audio trapping lure that operates only at night with actual recordings of prey animals' distress calls at predetermined time intervals of time and volume. The present invention deactivates and transmits a call or text message after determining that a predator is likely to have been trapped.

The trapping of predatory animals such as coyotes, bobcats, and fox always include the use of some sort of lure to attract these animals. There are many commercial liquid lures on the market, each designed for a specific animal. There are also lures that create sight appeal such as fur and feathers and then there are the seldom used audio lures.

The audio lures of the past have used live roosters or guineas in cages positioned in the woods to attract predators with the sounds they emit. The downfall with this sort of audio lure is that they make very little sound, if any, after dark—the very time when predators are hunting—or do not make sounds throughout the night hours.

There have also been electronic audio lures available to the trapping industry but they typically emit continuous high-pitched bird chirping sounds every few second and run continually. They are less than effective in hunting and virtually useless in the trapping industry. Further, the existing devices do not cause appropriate prey distress sounds having a controlled duration of emission and having a predetermined variable volume.

A cell phone text feature will greatly help trappers, letting them know if a catch has been made and its exact location. Another advantage of this feature is that several states have a 48-72 hour trap check law. This sometimes results in an animal enduring unnecessary stress in being in the trap for several days. This may actually be considered inhumane and would be deterred with this new cell phone feature.

Today's predator hunters have the latest technology available to them in the form of electronic predator distress calls. These calls have actual recordings of live prey animals in distress and are very lethal. But to be effective, the volume and durations of the calls must be monitored and controlled by the hunter. The trapping industry has not yet benefited from this technology.

Therefore, it would be desirable to have an audio trapping lure that emits the distress cries of a predator's prey at realistic intervals of time and at predetermined volumes and volume variations. Further, it would be desirable to have an audio trapping lure that operates only after darkness is detected so as not to attract other humans and their dogs to the trap site and to not utilize battery power during daylight hours when predator movement is less likely. In addition, it would be desirable to have an audio trapping lure that deactivates when the body-heat of a predator is detected which is indicative that the predator has already been trapped. Still further, it would be desirable to have a text message sent to the trapper's phone giving a unit number and therefore location of the deactivated device indicating a predatory animal has been trapped.

SUMMARY OF THE INVENTION

An audio trapping lure according to the present invention includes a housing defining an interior area for containing electronic components including a processor, a daylight sensor, a body heat sensor, cell phone transmission capabilities, and a speaker. The audio trapping lure includes digital sound files of the distress cries of prey of a predator to be hunted or trapped. Under the control of programming, the processor causes predetermined distress cries to be emitted through the speaker at predetermined intervals of time and for a predetermined duration. The audio trapping lure is activated only when the daylight sensor indicates it is dark. The audio trapping lure is deactivated when the body heat sensor 26 senses the proximity of a heat source, indicating the predator has already been trapped. The cell phone text function is activated upon the deactivation of the apparatus by the body heat sensor.

Therefore, a general object of this invention is to provide an audio trapping lure that emits the distress cries of a predator's prey at predetermined intervals of time and at predetermined volumes and volume variations.

Another object of this invention is to provide an audio trapping lure, as aforesaid, that deactivates when the heat of a predator is detected which is indicative that the predator has already been trapped.

Still another object of this invention is to provide an audio trapping lure, as aforesaid, that sends a text message to a remote cell phone when the apparatus is deactivated by the body heat sensor and which indicates an identifier or number of the device and therefore the location.

Still another object of this invention is to provide an audio trapping lure, as aforesaid, that is activated only at night.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1A:
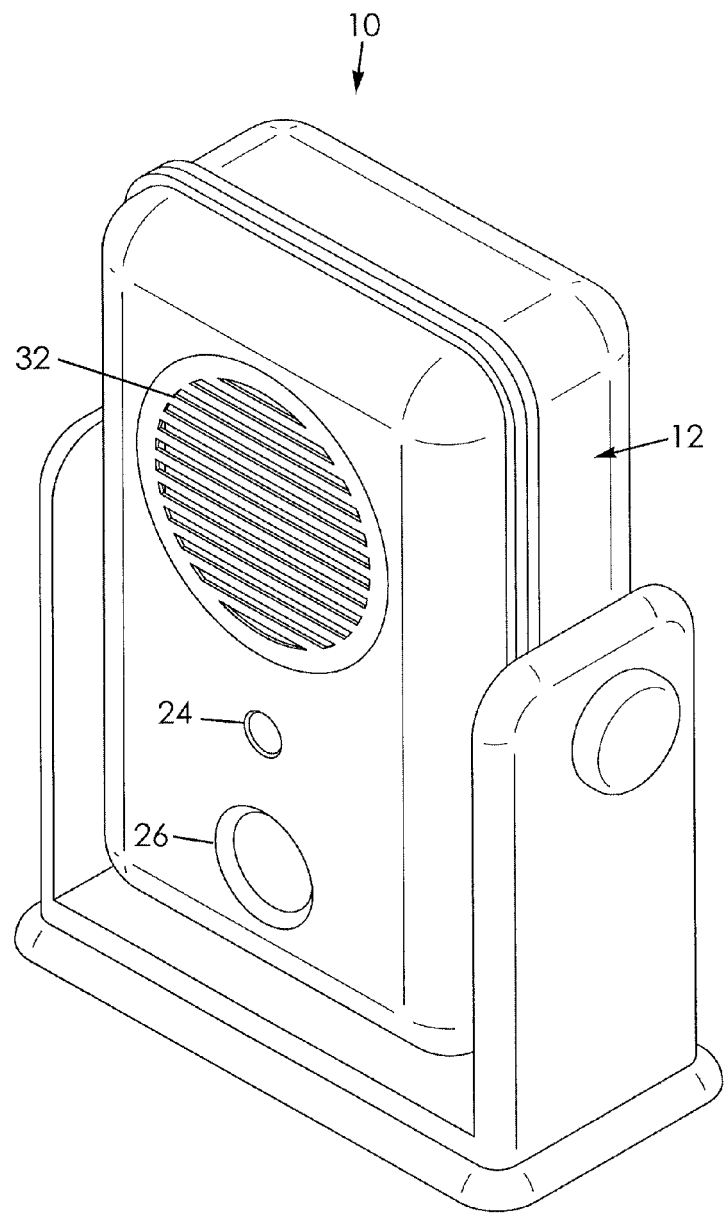
FIG. 1*a* is a perspective view of an audio trapping lure according to a preferred embodiment of the present invention.
Figure 1B:
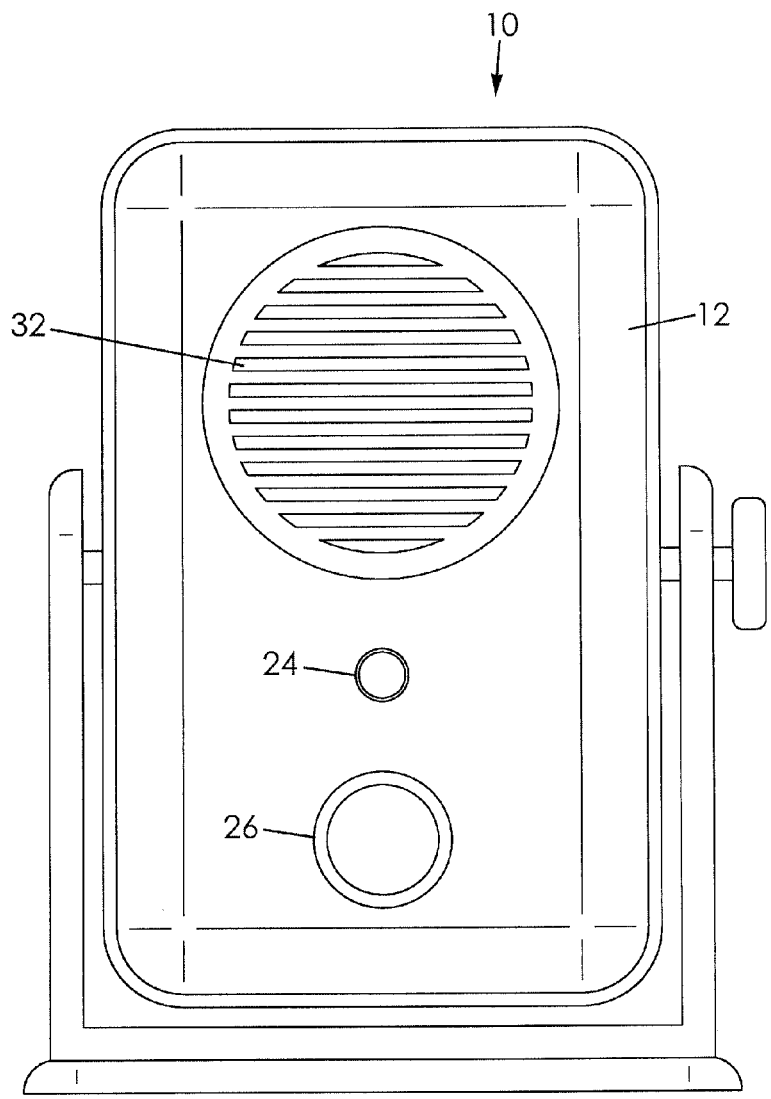
FIG. 1*b* is a front view of the audio trapping lure as in FIG. 1*a*.
Figure 2:
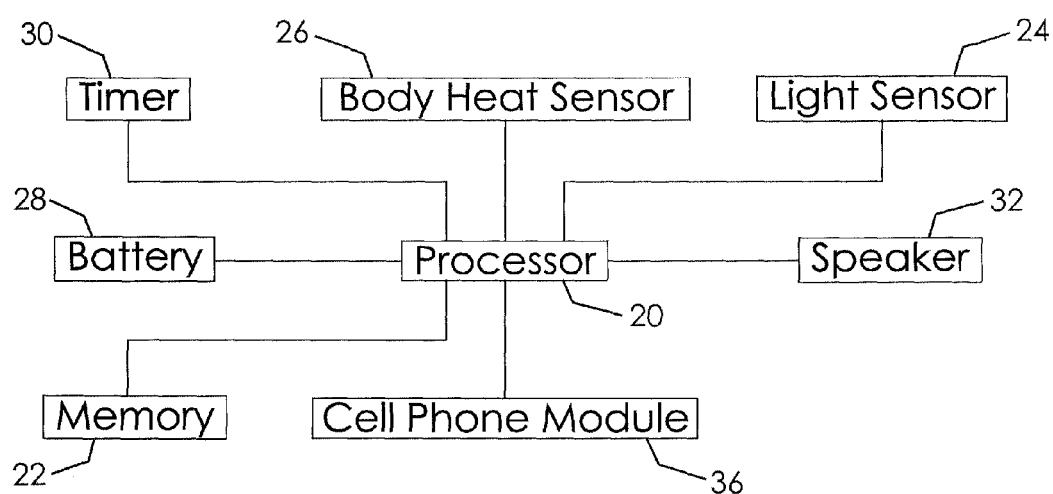
FIG. 2 is a block diagram illustrating electronic components of the audio trapping lure as in FIG. 1.

An audio trapping lure according to a preferred embodiment of the present invention will now be described in detail with reference to FIGS. 1 to 3 of the accompanying drawings. The audio trapping lure 110 includes a processor 20, a daylight sensor 24, a body heat sensor 26, a cell phone module 36, and related electronics situated on or in a housing 12.

The audio trapping lure 10 includes a housing 12 that defines an interior area of sufficient size to hold the electronic components of the present invention. Preferably, the housing 12 is constructed of durable materials as the predator audio trapping lure 110 will be positioned outdoors in use and will, therefore, be subjected to potentially harsh weather conditions such as rain, snow, and extreme temperatures. As illustrated in the accompanying drawings, the housing 12 may include a generally rectangular or box-shaped configuration with a speaker 32 situated so as to transmit sound in a generally forward direction. However, other housing configurations may also be suitable, such as a circular configuration that emits sound in a 360 degree pattern.

A battery 28 is situated in the interior area of the housing 12 and configured to provide electrical current to the electronic components described below. The battery 28 may be electrically connected to a status or "low-battery" light 34 positioned on an exterior of the housing 12 and configured to indicate when the battery 28 may need to be replaced. A processor 20 is positioned in the interior area of the housing and electrically connected to the battery 28. Alternatively, appropriate circuitry may be utilized rather than a processor 20 executing programming instructions. A memory 22 is electrically connected to the processor 20, the memory 22 configured to store data in suitable data structures. Specifically, the memory 22 may include data such as sound files of prey distress cries. The memory 22 may also include data structures associated with volume data, time duration data, a counter of sound emission cycles, and the like. Programming instructions to be executed by the processor 20 may also be stored in the memory 22. A timer 30 or similar circuitry is connected to the processor 20 and utilized to determine if a sound has been emitted for a predetermined amount of time as will be described further later. The timer 30 may also be accessed to calculate a "pause" between sound data emissions.

A daylight sensor 24 may be situated on an exterior surface of the housing 12 and be in data communication with the processor 20. Similarly, a body heat sensor 26 may be situated on or inside the housing 12 and is in data communication with the processor 20, the body heat sensor 26 being configured to sense the proximity of body heat indicative of a predator as will be described in more detail below. A speaker 32 is situated in the interior area of the housing 12 and electrically connected to the processor 20, the speaker 32 being configured to emit sounds as directed by the processor 20.

Components and circuitry pertaining to a cellular telephone is situated in the housing 12 and is referred to herein as a "Telephone Module 36." Specifically, the telephone module 36 is electrically connected to the processor 20 and, as such, is operatively connected to the body heat sensor 26. When the body heat sensor 26 detects heat indicative of an animal having been trapped, the processor 20 actuates the telephone module 36 to transmit a text message or voice call to a predetermined or user-set number such that a trapper is notified that an animal has been caught, as will be discussed in more detail below.

Figure 3:
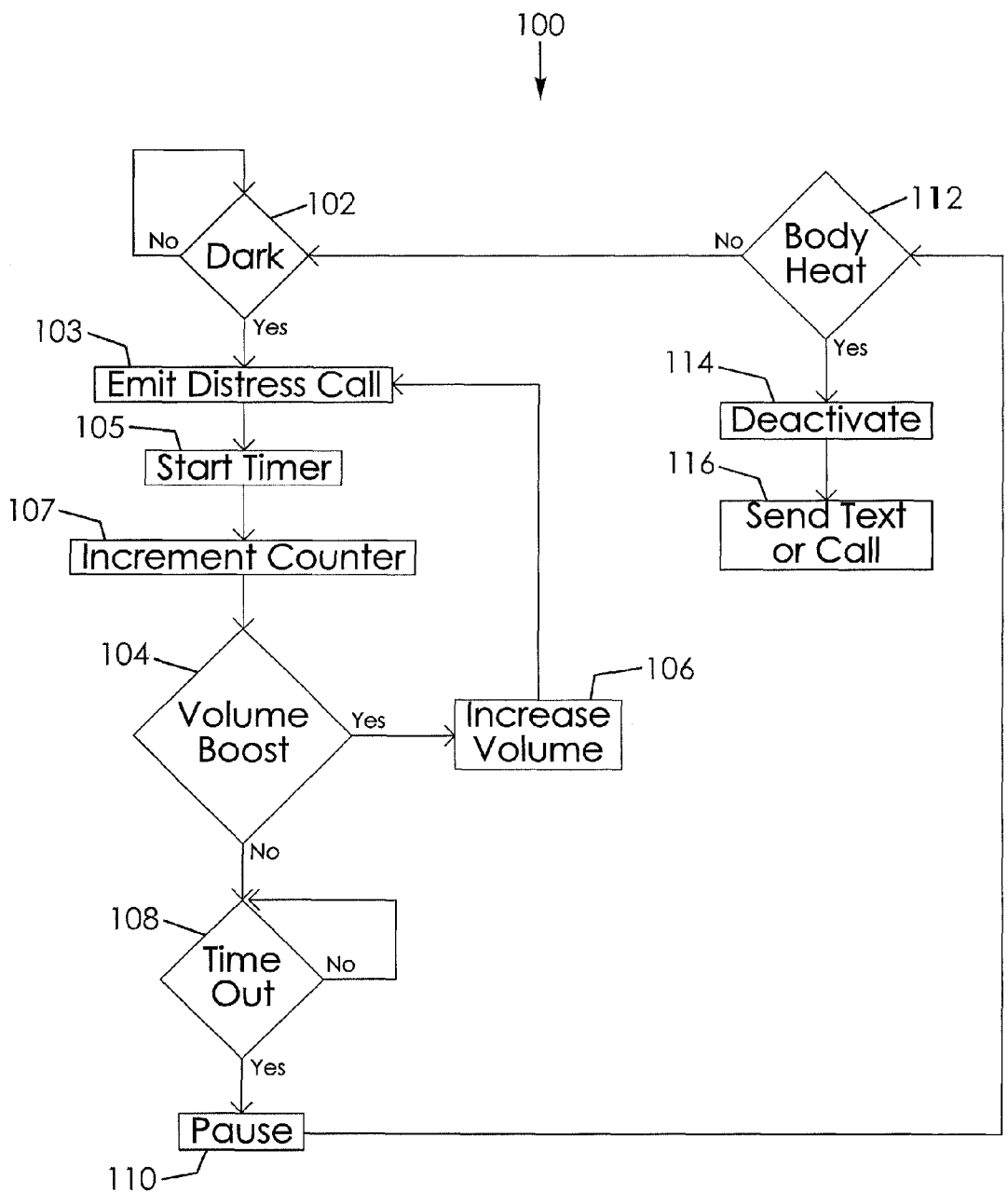
FIG. 3 is a flowchart illustrating the logic performed by a processor executing programming.

In use, the housing 12 may be situated adjacent a predator trap (not shown) and activated to function according to the logic illustrated in the flowchart shown in FIG. 3. FIG. 3 illustrates a process 100 carried out by the processor 20 executing programming instructions. At step 102, the processor 20 determines if the daylight sensor 24 indicates darkness versus the presence of ambient light. If it is determined to be dark, then the process 100 proceeds to step 103; otherwise, the process 100 just loops to step 102 again. At step 103, the processor 20 actuates the speaker 32 to begin emitting predetermined sound data stored in memory 22. For instance, the speaker 32 may emit the sounds of a bird or animal that is representative of the prey of a predator of the type seeking to be trapped. Preferably, the sounds are actual recorded sounds of the prey that the animal to be trapped is most likely to be lured by. The process 100 then proceeds to step 105.

At step 105, the processor 20 causes the timer 30 to be initiated. For instance, the timer 30 may be configured to count down from a predetermined time or may count up from zero to a predetermined time duration. The process 100 proceeds to step 107. At step 107, the process 100 causes the processor 20 to increment a counter, the counter being a data structure that represents the number of times that an animal distress cry data file has been played, e.g. the number of cycles of playing a distress call. The process 100 proceeds to step 104.

At step 104, the processor 20 determines if it is time for a "Volume Boost" cycle. In one embodiment, the speaker volume of an audio trapping lure 10 will be doubled for one 8 to 10 second emission of the audio trapping lure and then returned to a normal level. This may amount to a louder blast of the distressed cries about every fifth time the distressed cries are transmitted. The processor 20 determines if it is time for a volume boost by reviewing the counter data structure. If the processor 20 determines from the counter that a boost is indicated, then the process 100 proceeds to step 106; otherwise, control is forwarded to step 108. At step 106, the volume parameter is increased to a predetermined level and the process 100 returns control to step 103 where a predetermined distress cry is emitted by the speaker 32 at the raised volume level. The processor 20 will return the volume to an original level at the end of the boosted volume sequence.

At step 108, the processor 20 determines if emission of a distress cry sequence (as initiated at step 103) has reached a predetermined duration. For instance, the sound of a distressed prey is preferably played for about 8 to 10 seconds although other periods of time would also work. If the processor 20 determines that the time duration for playing the distress sound data has elapsed, then the process 100 proceeds to step 110; otherwise, the process 100 loops again to step 108 to again test for the time duration. It is understood that the processor 20 may query the timer 30 to determine the time duration of sound data emission. It is also understood that the timer 30 may be actuated to begin counting when sound emission is first actuated at step 103.

At step 110, the processor 20 executes programming instructions in cooperation with the timer 30 to pause operation of the process 100 for a predetermined time. In one embodiment, there may be a 3 minute pause in between each 8-10 second broadcast of prey audio sounds although other pause and broadcast durations are possible. After the pause, the process 100 proceeds to step 112.

At step 112, the processor 20 determines if the body heat sensor 26 has detected heat indicative of a predator in close proximity to the housing 12. It is understood that the housing 12 should be positioned by a trapper in close proximity to the trap itself (not shown). If heat is detected, then the process 100 proceeds to step 114; otherwise, the process 100 returns to step 102 and the process 100 begins again. At step 114, the emission of signals is deactivated, such as by preventing current from flowing from the battery 28 to other components until reset by a trapper. The assumption is that when body heat is sensed, a predator has been successfully trapped and there is no further need to emit distress cries. In an embodiment, it may be required that heat be detected for at least a predetermined period of time before determining that an animal has been trapped so as to avoid false alarms that may be caused by brief presence of a bird or the like near the heat sensor.

When the emission of animal distress sounds is deactivated at step 114, the process 100 proceeds to step 116. At step 116, the telephone module 36 is actuated to transmit a text message or call to a predetermined or user-set number such that a trapper is notified that an animal has been caught. In this manner, the stress on a trapped animal can be minimized. It is understood that transmission of a text message may also include an identifying code associated with the audio tracking lure 10 so that a trapper is informed as to which unit has trapped an animal and its location.

Accordingly, a trapper may set his trap to catch a predator. Then, the audio trapping lure 10 may be positioned in very close proximity to the trap (or even inside a trap housing) and activated to begin emitting sounds that imitate the cries of common prey of the predator being sought. The audio trapping lure 110 functions as described above according to process 100. If at any point the body heat sensor 26 senses heat indicative of the presence of a predator, the audio trapping lure 110 is deactivated by operation of the processor 20 on the assumption that a predator has been trapped. When the speaker emission is deactivated, the cell phone module 36 is actuated to transmit a text or voice message to a predetermined phone number so as to indicate to a trapper that an animal has been caught and needs to be processed without delay. The text message may also identify the unit that was activated so that the trapper knows the location of a potentially trapped animal.

It is understood that while certain forms of this invention have been illustrated and described, it is not limited thereto except insofar as such limitations are included in the following claims and allowable functional equivalents thereof.

The invention claimed is:

1. An audio trapping lure for use in luring an animal to a trap, comprising:
    a housing defining an interior area;
    a processor situated in said interior area and a battery electrically connected to said processor;
    a memory electrically connected to said processor and configured to store sound data indicative of predetermined prey;
    a speaker in data communication with said processor;
    a daylight sensor situated on an exterior surface of said housing and in data communication with said processor;
    a body heat sensor in data communication with the processor and configured to detect the proximity of body heat indicative of a predator;
    programming in a non-transitory computer-readable medium that, when executed by said processor, causes said processor to determine if light data from said daylight sensor is indicative of night and, if so, to actuate said speaker to emit said sound data through said speaker; and
    programming in a non-transitory computer-readable medium that, when executed by said processor, causes said processor to determine if heat data from said body heat sensor is indicative of a close proximity of an animal to said body heat sensor and, if so, to cease emission of said sound data.

2. The audio trapping lure as in claim 1, comprising:
    an electronic timer electrically connected to said processor and configured to measure a predetermined amount of time for said sound data to be emitted; and
    programming in a non-transitory computer-readable medium that, when executed by said processor, causes said processor to actuate said timer when said speaker is actuated to emit said sound data.

3. The audio trapping lure as in claim 2, comprising programming in a non-transitory computer-readable medium that, when executed by said processor, causes said processor to determine if said timer has elapsed and, if so, to terminate said emission of said sound data.

4. The audio trapping lure as in claim 3, comprising:
    a counter electrically connected to said processor and configured to count a number of cycles that said sound data has been emitted; and
    programming in a non-transitory computer-readable medium that, when executed by said processor, causes said processor to increase a volume of said speaker when said counter reaches a predetermined number of cycles.

5. The audio trapping lure as in claim 2, comprising:
    a counter electrically connected to said processor and configured to count a number of cycles that said sound data has been emitted; and
    programming in a non-transitory computer-readable medium that, when executed by said processor, causes said processor to increase a volume of said speaker when said counter reaches a predetermined number of cycles.

6. The audio trapping lure as in claim 4, comprising programming in a non-transitory computer-readable medium that, when executed by said processor, causes said processor to set the volume of said speaker to an original level when said counter is greater than said predetermined number of cycles and said timer has elapsed.

7. The audio trapping lure as in claim 2, comprising programming in a non-transitory computer-readable medium that, when executed by said processor, causes said processor to deactivate said emission of said sound data when said timer has elapsed.

8. The audio trapping lure as in claim 5, comprising programming in a non-transitory computer-readable medium that, when executed by said processor, causes said processor to deactivate said emission of said sound data when said timer has elapsed.

9. The audio trapping lure as in claim 7, comprising programming in a non-transitory computer-readable medium that, when executed by said processor, causes said processor to suspend processing for a predetermined amount of time.

10. The audio trapping lure as in claim 1, comprising:
    a cell phone module positioned in said interior space of said housing and in data communication with said processor, said cell phone module being configured to transmit a cellular signal; and
    programming in a non-transitory computer-readable medium that, when executed by said processor, causes said processor to actuate said cell phone module to deliver a cellular signal indicative that an animal has been detected by said body heat sensor.

11. The audio trapping lure as in claim 10, wherein said cellular signal includes a text message.

12. The audio trapping lure as in claim 9, comprising:
    a cell phone module positioned in said interior space of said housing and in data communication with said processor, said cell phone module being configured to transmit a cellular signal; and
    programming in a non-transitory computer-readable medium that, when executed by said processor, causes said processor to actuate said cell phone module to deliver a cellular signal indicative that an animal has been detected by said body heat sensor.

13. The audio trapping lure as in claim 8, comprising:
    a cell phone module positioned in said interior space of said housing and in data communication with said processor, said cell phone module being configured to transmit a cellular signal; and
    programming in a non-transitory computer-readable medium that, when executed by said processor, causes said processor to actuate said cell phone module to deliver a cellular signal indicative that an animal has been detected by said body heat sensor.

* * * * *